Nov. 30, 1965  L. A. MAIER, JR  3,221,135
METHOD OF WELDING FIN TUBE PANEL
Filed Dec. 24, 1963
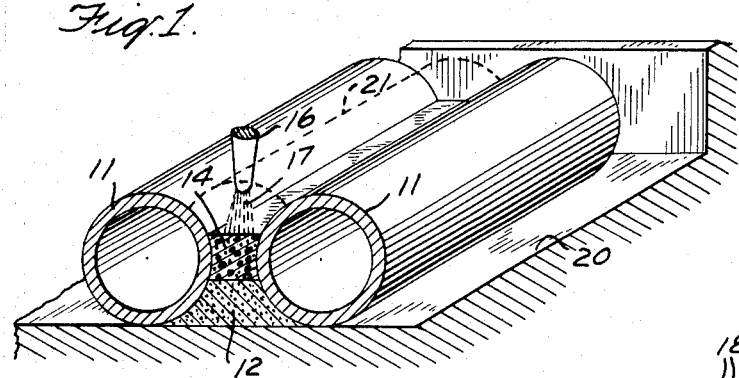
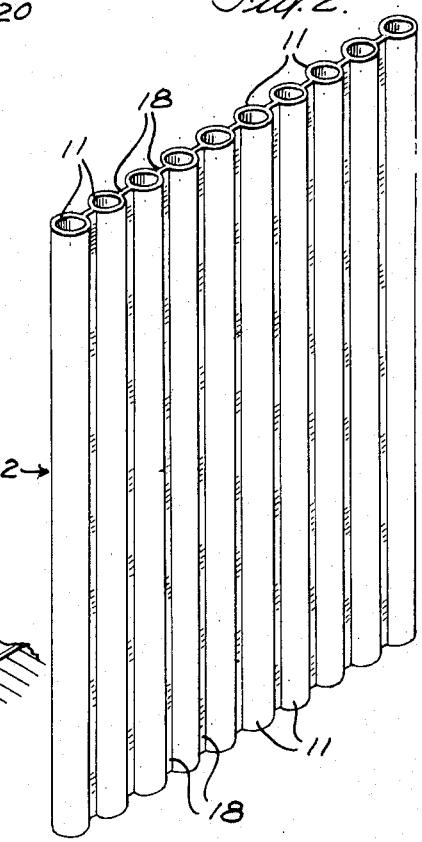
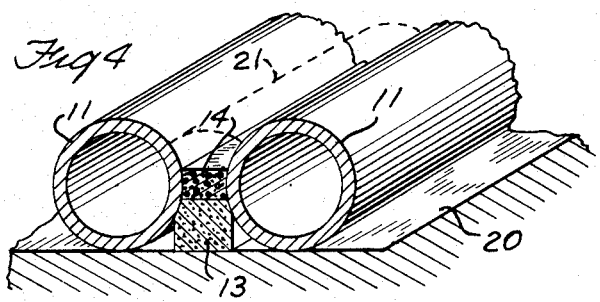
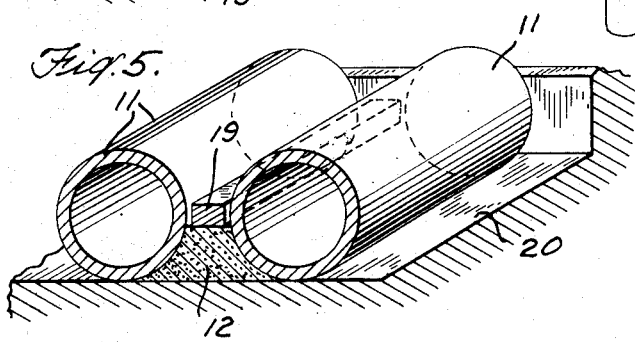
INVENTOR
LEO A. MAIER, JR.
BY John Maier, III
ATTORNEY

United States Patent Office 3,221,135
Patented Nov. 30, 1965

3,221,135
METHOD OF WELDING FIN TUBE PANEL
Leo A. Maier, Jr., Dansville Village, N.Y., assignor to Foster Wheeler Corporation, New York, N.Y., a corporation of New York
Filed Dec. 24, 1963, Ser. No. 333,217
19 Claims. (Cl. 219—137)

This invention relates to a method of welding together two adjacent metallic members, and, more particularly, a method of welding together thin-walled tubes to form fin-tube panels.

In the construction of fin-tube panels, a web or spanning piece of metal joins two adjacent tubes together. It is important, in the formation of such panels, that the fins or spanning members be completely fused into both of the adjacent tubes. However, it is also important during the formation and fabrication of such panels that no burn-through occurs which damages the tubes. Several methods are known in which a strip of metal is welded to the adjoining tubes by means of multiple weld passes. According to the multiple-pass methods, a solid metal piece is welded to the two adjoining tubes, often by making a weld pass at each of the four corners of the metal insert. Also, a half fin may be welded to each tube and the two halves then fused together. These methods and other similar methods are very suitable in many applications. However, where total fusion of the fin into both adjoining tubes is absolutely essential, it is preferable while making only one pass from a single side to completely melt the material of the fin member along with the surface material of the adjoining tubes, thereby assuring total and complete fusion between the fin and the tubes.

In the past, so far as is known, single-pass total fusion forming of fin-tube panels has been achieved by using a solid steel bar as the material for the fin and supporting the bar by a metallic backing strip having a sufficiently high melting point and thermal conductivity so that the molten material to be solidified into a fin is properly supported and that heat is dissipated from the weld area. The prior art has stressed the need for a backing strip made from a metallic element or alloy having both a high melting point and a high thermal conductivity. Practically speaking, such a backing strip would be made from a water-cooled bar of copper.

Although fin-tube panels can be formed by this method, it is apparent that for each change in tube diameter or fin spacing, a specially shaped backer is necessary. This would be true regardless of the general form and shape of the backer used. Furthermore, particles of the copper at least on occasion become included in the molten material resulting in a defect in the fin. Such defects are ready sources of corrosion. In addition, the copper backing strip becomes pitted and requires reforming on a shaping device. An additional problem with any solid backing is that gases formed in the welding operation become trapped between the molten material and the backing strip resulting in porosity. One aspect of this invention is to use a granular or powdered material which is preferably non-metallic as the backing so that the backing not only can be readily deposited to fill the space between the two tubes without regard to the size of the tubes or the spacing, but permits the ready flow of weld gases away from the weld area, thereby eliminating porosity. Such a backing is obviously economical to use and can be applied quickly and removed quickly.

Another aspect of the prior art has been to use only a filler material between the tubes which is in solid form, that is, either a bar or rod. Obviously, to change the alloy content of a bar, an entirely different piece of stock must be obtained. When granulated alloy material made from individual granulated metallic elements along with possibly flux additions is used, there is a great deal of flexibility in controlling the alloy content of the filler material. This is vitally important, as the alloy content of the filler material is used to control the alloy content of a resulting fin formed between the tubes in the panel.

Where granulated filler material is used, the heat of the arc is more effectively consumed, resulting in increased speed and economy of operation.

It is highly advantageous to develop an improved single-process performing fin-tube panel which is faster, more flexible, and results in an improved non-porous fin.

One object of this invention is to provide an improved method of constructing fin-tube panels.

Another object of this invention is to provide a method of forming a fin between two tubes which eliminates porosity.

Still another object of this invention is to provide a method of welding fin-tube panels in which there is flexibility in the control of the alloy content of the fin-tube.

Still a further object of this invention is to improve the speed of welding fin-tube panels.

Still an additional object of this invention is to improve the economy of welding fin-tube panels.

Other objects and a fuller understanding of the invention may be had by referring to the following description and claims taken in conjunction with the accompanying drawings in which:

FIGURE 1 is an isometric view of two parallel tubes located on a working surface, with a granular backing material supporting a granular metallic material between the tubes, and with the welding electrode adjacent the filler material.

FIGURE 2 is an isometric view of a completed fin-tube panel.

FIGURE 3 is an isometric view similar to FIGURE 1 showing the completed fin between two tubes after construction of the fin and removal from the backing material and work surface.

FIGURE 4 is an isometric view similar to FIGURE 1 showing the use of a metallic backing strip with granular metallic material between the tubes.

FIGURE 5 is an isometric view similar to FIGURE 1 showing the use of the granular backing material with a solid bar of filler material.

Referring to the drawings, FIGURE 1 shows two steam generating tubes 11 located on a work surface 20 side by side in a parallel manner. A powder or granular material 12 is placed in the lower area between the tubes 11 to serve as a backing material. A wide range of powdered materials are suitable for this purpose. Titanium dioxide or aluminum oxide which both have a very high melting temperature are satisfactory, but foundary sand is also suitable along with pulverized or granulated fire clay. All of these materials are thermally and electrically insulating. In the use of either titanium dioxide or aluminum oxide, either individually or in combination, manganese dioxide or silicon dioxide or both may be mixed into the backing material. However, any material having a high melting temperature in powdered or granular form is suitable. Also possible for use as a backing material 12 is an inert material such as fire clay or sand with a flux such as used in submerged-arc welding placed on top of it or intermingled with it.

In order to supply at least a portion of the filler material required to form the fin, a powdered alloy filler material 14 is placed above the backing material 12 in the intermediate area which has the closest space between the two tubes. Providing submerged-arc welding is used, a flux 21 is placed over the granulated alloy material 14.

When submerged-arc welding is used, or any other welding technique using a consumable electrode, the electrode material and the powdered alloy material are mixed when molten to form a fin 18. It is readily obvious that limitations on the alloy content of a continuous electrode may be compensated for by the proportioning of particular elements in the powdered alloy material. Such flexibility in compensating for alloy limitations in the consumable electrode is not possible with a solid filler material. This is extremely important since a consumable electrode must be fed from a reel and therefore cannot contain certain alloy ingredients which would make the required amount of workability of the consumable electrode impossible.

In the usual application of consumable electrode welding, the arc from the electrode is struck directly on the work piece. In this particular application the arc 17 is struck between the electrode 16 and the granular alloy material 14. Although other sources of welding heat may be used, a submerged-arc process is preferred. This means that the electrode 16 is preferably consumable but may be non-consumable. As the electrode 16 is consumed by the heat of the arc 17, the electrode 16 is fed into the arc at the same rate, thereby maintaining a constant spacing between the end of the consumable electrode 16 and the granular alloy material 12.

Equipment (not shown) well-known in the welding art for depositing flux and powdered metal may be used to automatically deposit first the granular material 12 and then the granular alloy material 14 in advance of the welding torch. In addition, if submerged-arc welding processing is being used, the necessary welding flux may also be deposited in the same operation. Also, of course, these materials may be deposited manually such as with a measuring scoop. Standard equipment, such as a manually operated grate (not shown) may be used to quickly remove the granulated backing material following a welding operation.

When electric power is supplied to the electrode 16, an arc 17 is struck between the electrode 16 and the granulated alloy material 14. The heat of the arc 17 melts both the electrode 16 and granulated alloyed material 12. Molten metal formed by the melting of the electrode 16 and granulated alloy material 12 is supported by the backing material 12. The adjoining end surface of the tubes 11 becomes molten and then solidifies with the fin 18 which is completely fused to the tubes 11.

During the welding operation the gases formed by the welding are conveyed through the powdered backing material 12, preventing the gases from being trapped between the molten metal and the granulated backing material 12, thereby avoiding porosity. Likewise, because of the high temperature characteristics of the granular backing material 12 and the closeness of the particles, it serves as a dam against the molten material dropping or losing its proper form. As best seen in FIGURE 2, a panel 22 is formed by a series of parallel tubes 11 spaced apart by fins 18. By continuously adding tubes 11 and fins 18, or by simultaneously performing multiple welding operations, the panel 22 is formed in accordance with this invention.

Some of the alloy ingredients usually contained in the granulated alloy material 14 are chromium, nickel, copper, molybdenum, vanadium, silicon, manganese, carbon, cobalt, tungsten, and boron. In addition to these and other metallic elements in various quantities and combinations, flux may be added to the granulated welding material 14. Granulated alloying or welding materials 14 both with flux and without flux have been used in other operations such as cladding and are obtainable commercially at least in certain of the possible ingredient combinations. One suitable powdered metallic flux-bearing filler material 14 is made by mixing finely divided powders in suitable proportions as required in the alloying layer. This mixture is added to sodium silicate which serves as a bonding agent. Also a protective flux generally used in submerged-arc welding is used. The particles are cemented together and rebroken down by grinding or some other suitable method to produce round agglomerated particles of the proper size. A suitable protective flux contains in various proportions, calcium oxide, silicon dioxide, magnesium oxide, and aluminum oxide.

The preferred embodiment of this invention is to use a granular metal alloy material 14 usually without a flux content over an inexpensive granular backing material 12, such as sand or fire clay. Preferably a submerged-arc welding process is used in conjunction with the filler material and a suitable flux 21 for use in submerged-arc welding is placed over the granular alloying material 14. Although the combined use of both the granular metal 14 and the granular backing 12 is preferred, it is an aspect of this invention, as best seen in FIGURE 4, to use a granular alloy material 14 with a solid backing strip 13. Submerged-arc flux 21 is placed over the granular alloy material 14. Likewise, another aspect of this invention, as best seen in FIGURE 5, is to use a solid metal filler 19 with a granular backing 12.

It is to be understood that the above-described methods and arrangements are simply illustrations of the application of the principles of the invention. Numerous other methods and arrangements may be readily devised by those skilled in the art which will embody the principles of this invention and follow within the spirit and scope thereof.

What is claimed is:

1. A single-pass method of forming a fin between two parallel, spaced, thin-walled tubes, comprising:
    placing a layer of granular backing in the lower area between two parallel, spaced, thin-walled tubes, said granular backing having a high melting temperature and being thermally and electrically insulating,
    placing a layer of granular alloying material over said granular backing layer in the intermediate area between the two tubes,
    applying a welding heat to the layer of granular alloying material, said welding heat having sufficient intensity to melt said granular alloying material,
    moving said welding heat along said layer of granular alloying material at a rate such that the granular alloying material is completely melted and fused to the adjacent tubes, said granular backing being capable of being in contact with the molten material without becoming fused thereto,
    removing said layer of granular backing.

2. The method according to claim 1 wherein the granular backing is sand.

3. A method according to claim 1 wherein the granular backing is pulverized fire clay.

4. A method according to claim 1 wherein the granular backing is titanium dioxide.

5. A method according to claim 1 wherein the granular backing is aluminum oxide.

6. A single-pass method of forming a fin between two parallel, spaced, thin-walled tubes, comprising:
    placing a layer of granular backing in the lower area between two parallel, spaced, thin-walled tubes, said granular backing having a high melting temperature and being thermally and electrically insulating,
    placing a layer of granular weld material in the intermediate area between the two said tubes above the granular backing,
    striking an electric arc from a consumable electrode to the layer of granular weld material, said arc having a sufficient heat to melt both the electrode and the elements,
    moving the arc along the layer of granular weld material such that the granular weld material and electrode are completely melted and then fused to the adjacent tubes, said granular backing being capable of being in contact with the molten material without becoming fused thereto, removing the granular backing material.

7. A method according to claim 6 wherein the granular backing is sand.

8. A method according to claim 6 wherein the granular backing is pulverized fire-clay.

9. A method according to claim 6 wherein the granular backing is titanium dioxide.

10. A method according to claim 6 wherein the granular backing is aluminum oxide.

11. A single-pass method of forming a fin between two parallel, spaced, thin-walled tubes, comprising:
placing a layer of granular backing in the lower area between two parallel, spaced, thin-walled tubes, said granular backing having a high melting temperature and being thermally and electrically insulating,
placing a bar of ferrous metal over said layer of granular material in the intermediate area between the two tubes,
striking an electric arc from a consumable electrode to the bar, said arc having a sufficient heat to melt both the electrode and the bar,
moving the arc along the bar of ferrous metal such that the bar and electrode are completely melted and then fused to the adjacent tubes, said granular backing being capable of being in contact with the molten material without becoming fused thereto, and
removing the granular backing material.

12. A single-pass method of forming a fin between two parallel, spaced, thin-walled tubes, comprising:
placing a metallic backing strip having a high melting temperature in the lower area between two parallel, spaced, thin-walled tubes,
placing a layer of granular weld elements above the metallic backing strip in the intermediate area between the two said tubes,
striking an electric arc from a consumable electrode to the layer of granular weld elements, said arc having a sufficient heat to melt both the electrodes and the elements,
moving the arc along the layer of granular weld material such that the granular weld material and electrode are completely melted and are fused to the adjacent tubes, said metallic backing strip being capable of being in contact with the molten material without becoming fused thereto, and
removing the metallic backing strip.

13. A single pass method of forming a fin between two parallel, spaced, thin-walled tubes, comprising:
placing a layer of granular backing in the lower area between two parallel, spaced, thin-walled tubes, said granular backing having a high melting temperature and being thermally and electrically insulating,
placing a layer of granular weld metal in the intermediate area between the two said tubes above the granular backing,
placing a layer of welding flux over the said layer of granular weld metal,
striking an electric arc from a consumable electrode to the layer of granular weld metal by submerging the consumable electrode into the welding flux,
said arc having a sufficient heat to melt both the electrode and the elements,
moving the arc along the layer of granular weld material such that the granular weld metal and electrode are completely melted and then fused to the adjacent tubes, said granular backing being capable of being contact with the moltent material without becoming fused thereto, removing the granular backing material.

14. A method according to claim 13 wherein the granular backing is sand.

15. A method according to claim 13 wherein the granular backing is pulverized fire clay.

16. A method according to claim 13 wherein the granular backing is titanium dioxide.

17. A method according to claim 13 wherein the granular backing is aluminum oxide.

18. A single pass method of forming a fin between two parallel, spaced, thin-walled tubes, comprising:
placing a layer of granular backing in the lower area between two parallel, spaced, thin-walled tubes, said granular backing having a high melting temperature and being thermally and electrically insulating,
placing a bar of ferrous metal over said layer of granular metal in the intermediate area between the two tubes,
placing a layer of welding flux over said bar of ferrous metal,
striking an electric arc from a consumable electrode to the bar by submerging the consumable electrode in the welding flux,
said arc having a sufficient heat to melt both the electrode and the bar,
moving the arc along the bar of ferrous metal such that the bar and electrode are completely melted and then fused to the adjacent tubes,
said granular backing being capable of being in contact with the moltent material without being fused thereto, and
removing the granular backing material.

19. A single pass method of forming a fin between two parallel, spaced, thin walled tubes, comprising:
placing a metallic backing strip in the lower area between two parallel, spaced, thin walled tubes,
placing a layer of granular weld elements over the metallic backing in the intermediate area between the two tubes,
placing a layer of welding flux over the layer of granular weld elements,
striking an electric arc from a consumable electrode to the layer of granular weld elements by submerging the consumable electrode into the welding flux, said arc having a sufficient heat to melt both the electrode and the elements,
moving the arc along the layer of granular weld material such that the granular weld material and electrode are completely melted and are fused to the adjacent tubes, said metallic backing strip being capable of being contact with the moltent material without becoming fused thereto, and
removing the metallic backing strip.

References Cited by the Examiner

UNITED STATES PATENTS

| | | | |
|---|---|---|---|
| 2,145,009 | 1/1939 | Keir | 219—73 |
| 2,719,210 | 9/1955 | Chapman | 219—137 |
| 2,927,990 | 3/1960 | Johnson | 219—73 |
| 2,993,983 | 7/1961 | Carpenter et al. | 219—124 |
| 3,076,888 | 2/1963 | Arnoldby | 219—73 |

RICHARD M. WOOD, *Primary Examiner.*